(12) United States Patent
Ling et al.

(10) Patent No.: US 8,566,847 B2
(45) Date of Patent: Oct. 22, 2013

(54) OUT-OF-BAND HOST MANAGEMENT VIA A MANAGEMENT CONTROLLER

(75) Inventors: Robert Ling, San Jose, CA (US); Yu Xu, Folsom, CA (US); Sunil A. Bhagia, Olympia, WA (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 13/046,449

(22) Filed: Mar. 11, 2011

(65) Prior Publication Data

US 2012/0233628 A1   Sep. 13, 2012

(51) Int. Cl.
*G06F 9/44*   (2006.01)
(52) U.S. Cl.
USPC ............ 719/328; 719/318; 719/323; 710/22; 710/26; 710/301; 709/203; 709/217; 709/221

(58) Field of Classification Search
None
See application file for complete search history.

(56) References Cited

U.S. PATENT DOCUMENTS

| | | | |
|---|---|---|---|
| 6,292,485 B1 * | 9/2001 | Trotta et al. ................... 370/389 |
| 6,681,232 B1 * | 1/2004 | Sistanizadeh et al. ................ 1/1 |
| 2003/0053475 A1 * | 3/2003 | Veeraraghavan et al. ..... 370/431 |
| 2004/0210623 A1 * | 10/2004 | Hydrie et al. ................ 709/201 |
| 2004/0255171 A1 * | 12/2004 | Zimmer et al. ............... 713/300 |
| 2007/0253427 A1 * | 11/2007 | Stirbu ...................... 370/395.21 |

\* cited by examiner

*Primary Examiner* — Andy Ho
*Assistant Examiner* — Shih-Wei Kraft
(74) *Attorney, Agent, or Firm* — Patterson & Sheridan, LLP

(57) ABSTRACT

Techniques presented herein provide approaches for out-of-band host management via a management controller. In one embodiment, the management controller provides an application programming interface (API) specifying one or more functions for managing one or more applications executing on a host computer. The one or more functions may be invoked by a requesting entity.

10 Claims, 5 Drawing Sheets

OUT-OF-BAND HOST MANAGEMENT VIA A MANAGEMENT CONTROLLER

TECHNICAL FIELD

Embodiments presented in this disclosure generally relate to techniques for host management and, more particularly, to techniques for out-of-band host management via a management controller.

BACKGROUND

As the number of computer servers used by businesses has substantially increased, a number of techniques have been developed to remotely manage the operation of such servers. For example, large data centers are frequently managed using a variety of different remote management tools, including, e.g., simple terminal connections, remote desktop applications and sophisticated software tools used to configure, monitor, and troubleshoot both computer hardware and software. The remote management tools are often configured to communicate using standardized protocols.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
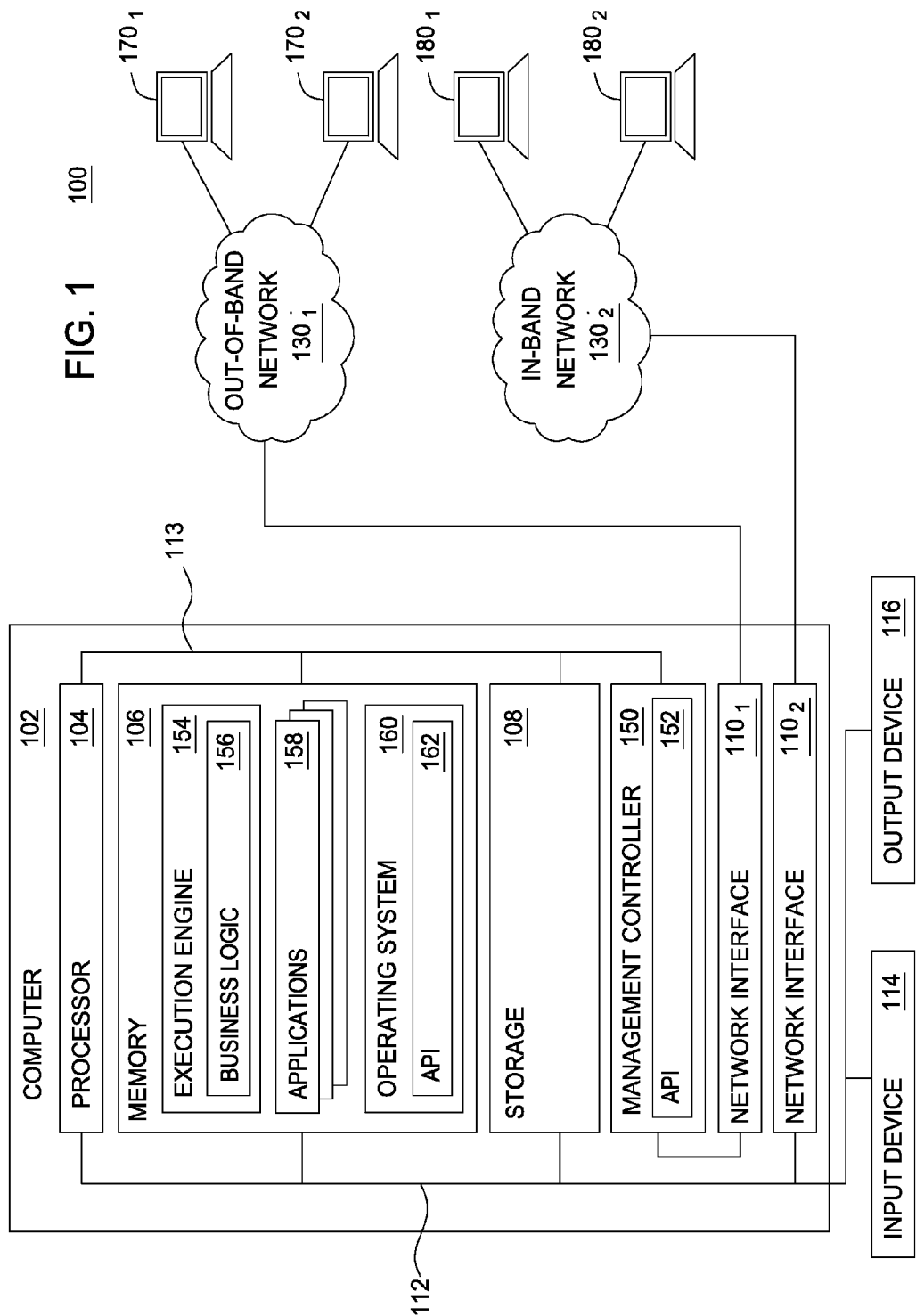
FIG. 1 is a block diagram illustrating a system for managing a computer via an out-of-band network, according to one embodiment.

One embodiment provides a system that includes one or more computer processors, a memory and a management controller. The memory contains one or more applications. The management controller is communicatively connected to: (i) an out-of-band network for accessing the management controller and (ii) a private network for communicating with an execution engine running on the system. The management controller is configured to perform an operation for managing the system. The operation includes providing a first application programming interface (API). The first API specifies one or more functions for managing at least a first one of the applications. The operation also includes receiving, via the out-of-band network, a request for the first application to perform a predefined action, wherein the request invokes a function specified in the first API. The operation also includes, via the private network, sending the request to the execution engine to instruct the first application to perform the predefined action responsive to the request.

Another embodiment provides a management controller configured to perform an operation for managing a host computer, the host computer including a computer processor, a memory, and the management controller. The operation includes providing a first application programming interface (API). The first API specifies one or more functions for managing one or more applications executing on the host computer. The operation also includes receiving, via an out-of-band network for accessing the management controller, a request for at least a first one of the applications to perform a predefined action, wherein the request invokes a function specified in the first API. The operation also includes, via a private network communicatively connecting the management controller to an execution engine running on the host computer, sending the request to the execution engine to instruct the first application to perform the predefined action responsive to the request.

Yet another embodiment provides a computer-implemented method that includes providing a first application programming interface (API). The first API specifies one or more functions for managing one or more applications executing on a host computer. The method also includes receiving, via an out-of-band network for accessing a management controller configured to manage the host computer, a request for at least a first one of the applications to perform a predefined action, where the request invokes a function specified in the first API. The method also includes, via a private network communicatively connecting the management controller to an execution engine running on the host computer, sending the request to the execution engine to instruct the first application to perform the predefined action responsive to the request.

DESCRIPTION OF EXAMPLE EMBODIMENTS

Embodiments presented in this disclosure provide techniques for out-of-band host management via a management controller. The management controller is configured to manage a variety of functions of a host computer, such as sensors and power operations. To this end, the management controller may communicate with components of the host computer using messages composed according to the Intelligent Platform Management Interface (IPMI) specification. IPMI refers to monitoring, system control and communication interfaces implemented directly in platform management hardware and firmware (e.g., the hardware and firmware of the host computer). Examples of a management controller include a baseboard management controller (BMC) and a lights out management system.

In one embodiment, the management controller provides a first application programming interface (API) for managing one or more applications (or operating system) executing on the host computer. A user of a management console may send a request to the management controller via an out-of-band network of the host computer. The management controller may forward the request to an execution engine executing on the host computer. For example, the request may be forwarded via a private network between the management controller and the host computer. The private network may be provided by one or more virtualized network interface cards (NICs) via a bus operatively connecting the management controller and the host computer. In one embodiment, the bus operates in accordance with the Universal Serial Bus (USB)

specification. Further, depending on the embodiment, the first API and/or the execution engine may be extensible during runtime.

By configuring the management controller, the execution engine, and/or the private network according to the techniques disclosed herein, the management controller may manage applications executing on the host computer more conveniently and/or efficiently at least in some cases. For example, the management controller may manage applications executing on the host computer without requiring drivers to be written or provided for the operating system executing on the host computer, the drivers implementing some or all of the functionality provided by the first API. At least in some cases, the first API may be more easily and/or conveniently extensible when the first API is not dependent on the drivers for the operating system of the host computer. Accordingly, the first API facilitates managing applications executing on the host computer, e.g., where the host computer operates as part of a cloud computing infrastructure. In this regard, the applications may be managed more consistently relative to other approaches in which the management controller does not communicate with the host computer and that manage the applications on an inconsistent and/or ad-hoc manner. For example, using the techniques disclosed herein, the management controller may serve as a proxy to applications executing on the host computer, and the applications may be managed without having to correlate the host computer to the management controller.

The following discussion references various embodiments. However, it should be understood that the disclosure is not limited to specific described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may request the one or more applications to execute in the cloud. Having the one or more applications execute in the cloud allows the user to manage execution of the one or more applications from any computing system attached to a network connected to the cloud (e.g., the Internet).

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for managing a computer via an out-of-band network, according to one embodiment. The networked system 100 includes a computer 102. The computer 102 may be referred to herein as a host computer and may be connected to other computers 170, 180 via the networks 130. In general, each network 130 may be a telecommunications network and/or a wide area network (WAN). The networks 130 include an out-of-band network $130_1$ and an in-band network $130_2$. The in-band network $130_2$ provides network connectivity to the system 100, and the out-of-band network $130_1$ is an independent network dedicated for managing components of the system 100, regardless of whether the in-band network $130_2$ is available. For example, the in-band network $130_2$ may be unavailable when a problem occurs with a component of the in-band network $130_2$, such as a switch, router or the computing system 100.

The computer 102 generally includes a processor 104 connected via a bus 112 to a memory 106, a network interface device $110_2$, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. Each network interface device $110_{1-2}$ may be any type of network communications device allowing the computer 102 to communicate with other computers via the respective network $130_{1-2}$.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen may be used.

In one embodiment, the computer 102 also includes a management controller 150 connected to the processor 104, the memory 106, and/or the storage 108 via a private network 113. The management controller 150 is further connected to the out-of-band network $130_1$. The private network 113 is connected to the out-of-band network $130_1$ via a network interface $110_1$. Depending on the embodiment, some or all of the functionality of the private network 113 may be integrated into the bus 112. Further, the private network 113 may serve to extend the out-of-band network $130_1$ to include the processor 104 of the computer 102—rather than merely the management controller 150. In one embodiment, the private network 113 includes a bidirectional Internet Protocol (IP) network provided by one or more virtualized network interface cards (NICs) over a bus operatively connecting the management controller 150 and the processor 104. The management controller 150 manages one or more network addresses on the private network, including a first network address for the management controller 150 and a second network address for the computer 102. In one embodiment, each network address is an Internet Protocol (IP) address.

As shown, the memory 106 of the computer 102 includes an execution engine 154, an operating system 160 and applications 158. The management controller 150 communicates with the execution engine 154 via the private network 113, and vice versa. In one embodiment, the management controller 150 provides a first application programming interface (API) 152 for managing the applications 158 and/or the operating system 160 executing on the computer 102. The management controller 150 may operate in accordance with a predefined architecture, such as Representational State Transfer (REST). REST refers to a stateless client-server architecture for distributed hypermedia systems, in which web services are viewed as resources and can be identified by their Uniform Resource Locators (URLs). Additionally or alternatively, the management controller 150 may provide interfaces according to predefined protocols, such as Telnet and Secure Shell (SSH). In some embodiments, access to the first API may be secured via mechanisms for user authorization, role-level authentication and/or encryption. For example, access to the first API may be encrypted via Secure Sockets Layer (SSL) or Transport Layer Security (TLS).

In alternative embodiments, the execution engine 154 runs on the management controller 150 rather than on the processor 104. For instance, the execution engine 154 running on the management controller 150 may communicate with one or more host agents executing on the processor 104. The communication may occur via SSH, and the host agents may be Windows Management Instrumentation (WMI) or Simple Network Management Protocol (SNMP) agents provided by the operating system 160. WMI refers to a set of extensions to Windows Driver Model (WDM) that provides an OS interface for managing instrumented components, and SNMP refers to a protocol for managing devices on IP networks.

In one embodiment, the management controller 150 receives a request for an application 158 or the operating system 160 to execute a predefined command. Further, the request may include an invocation of a function specified in the first API 152. The function specified in the first API 152 may be invoked from the computer 102 or from a remote computer 170. More specifically, in some embodiments, the request may be received from a management console executing on the computer 102. In other embodiments, the request may be received via the out-of-band network $130_1$ from a management console executing on the remote computer 170. For instance, the management console may request for more virtualized (NICs) to increase network bandwidth on the computer 102. Distributing the management controller 150 and the management console across the networked system 100 may make the networked system 100 more fault-tolerant at least in some cases. The management controller 150 may receive the request from the management console during an SSL session. Additionally or alternatively, the request may be composed as specified by the REST architecture. As an example, suppose the request specifies to restart a web server application executing on the computer 102. In this particular example, the request may access the following URL: cimc.cisco.com/api/host/webserver/restart. In response to receiving the request, the management controller 150 may authenticate the request and then send the request to the execution engine 154 via the private network 113.

In one embodiment, upon receiving the request, the execution engine 154 retrieves business logic 156 associated with the invoked function. The execution engine 154 then executes the business logic 156, such that the application 158 and/or operating system 160 execute the predefined command. In some embodiments, the business logic 156 may invoke one or more functions specified in a second API 162 provided by the operating system 160. The execution engine 154 may also send results of executing the business logic 156 to the management controller 150 via the private network 113. The results may specify whether the execution of the business logic 156 is successful and/or may include output associated with executing the business logic 156. Because the management console may typically anticipate receiving results from the management controller, the management controller 150 may send the results to the management console via the out-of-band network $130_1$. In addition, as further described below, the management controller 150 and/or the execution engine 154 may be extensible during runtime.

By configuring the management controller 150, the private network 113, and/or the execution engine 154 using the techniques disclosed herein, the management controller 150 may manage applications and/or services executing on the computer 102—in addition to hardware and/or firmware components of the computer 102. Further, the applications and/or services may be managed even when the in-band network 130 is unavailable or otherwise operating in a degraded state. For example, an administrator may physically or logically remove the computer 102 from the in-band network $130_2$, in response to a security incident.

Additionally, the management console may manage applications and/or services executing on the computer more reliably than invoking an API via the in-band network $130_2$, where the API is implemented by a host agent executing on the processor 104. For example, the management controller 150 may remain available at times during which the host agent is unavailable or running in a degraded state or the computer 102 is intentionally removed from the in-band network $130_2$.

As described above, the first API 152 specifies functions for managing one or more applications executing on the computer 102. For example, one such function could be invoked to power off the computer 102. By configuring the computer 102 using the techniques disclosed herein, the execution engine 154 may coordinate with the operating system 160 to allow the operating system 160 to perform a graceful shutdown prior to powering off the computer 102. Allowing the operating system 160 to perform a graceful shutdown may simplify out-of-band management of the computer 102 at least in some cases, relative to signaling the computer 102 to power off without coordinating with the operating system 160.

In one embodiment, another function could be invoked to configure the operating system 160 with a static IP address for the in-band network $130_2$. Accordingly, the second function may be invoked to initially set the static IP address for the computer 102, without first requiring the computer 102 to connect to the in-band network $130_2$. Of course, other functions for managing the one or more applications are broadly contemplated. For example, one function may specify to transmit one or more patches to the computer 102. Accordingly, an administrative user may invoke the one function, subsequent to a security incident prompting the administrative user to intentionally remove the computer 102 from the in-band network $130_2$. Another function may specify to transmit, via the out-of-band network $130_1$ and the private network 113, an SSL certificate to the computer 102 for use with the in-band network $130_2$, without first requiring the computer 102 to connect to the in-band network $130_2$. Still another function may specify to start, stop or restart one or more hypervisors executing on the computer 102. Yet another function may instruct the computer 102 to route network traffic through the out-of-band network $130_1$ rather than through the in-band network $130_2$. To this end, the management controller may provide a Transmission Control Protocol/Internet Protocol (TCP/IP) stack. In this regard, the private network, the management controller, and the out-of-band network $130_1$ may operate as a failover network for the in-band network $130_2$. Still another function may instruct the operating system 160 to execute one or more predefined commands. In some embodiments, one or more of the commands may be configured to modify and/or repair a registry of the operating system 160. Still another function may instruct the operating system 160 to execute a predefined shell script containing one or more commands.

Figure 2:
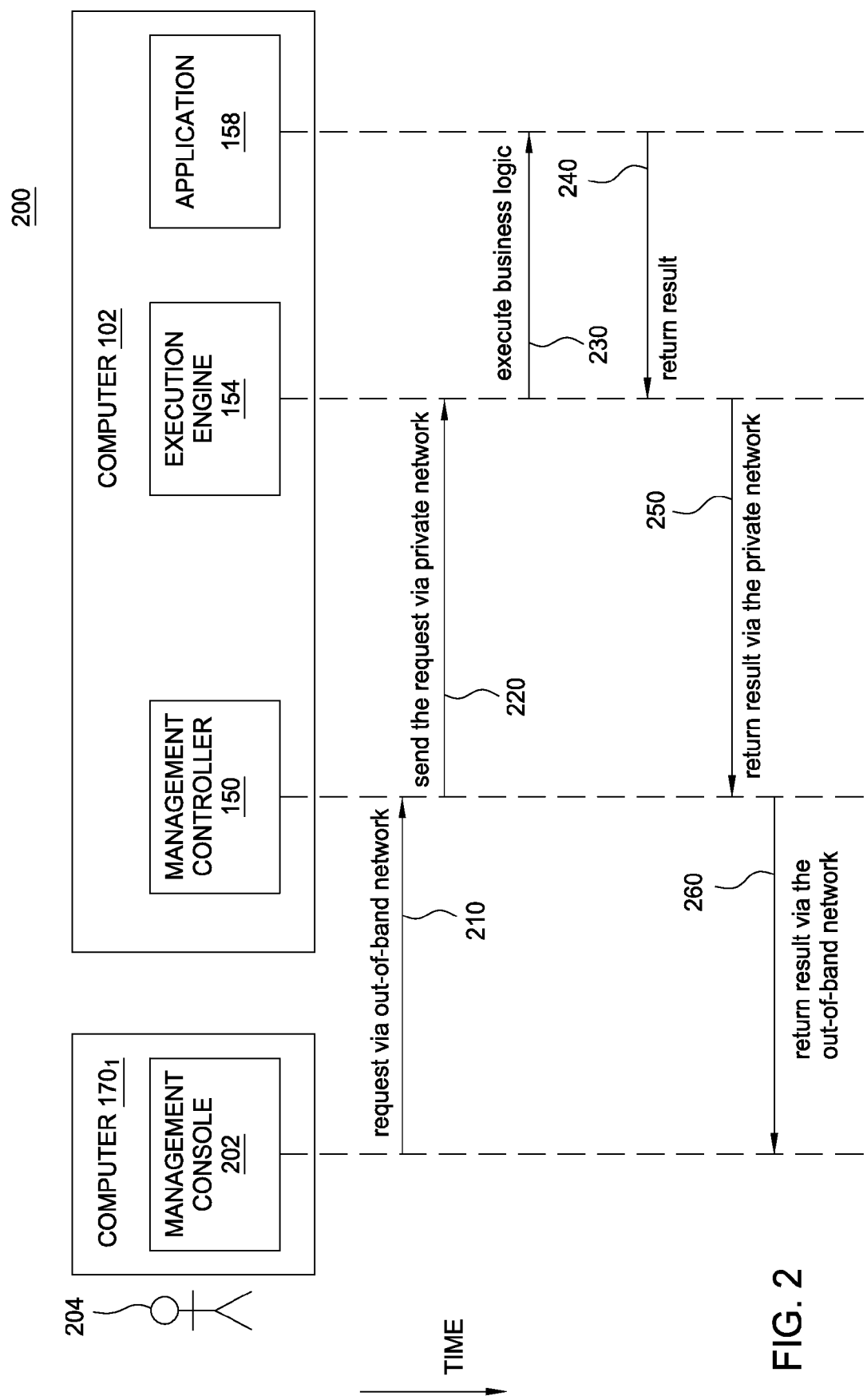
FIG. 2 is a sequence diagram illustrating an operation for managing a host computer, according to one embodiment.

FIG. 2 is a sequence diagram illustrating an operation 200 for managing the computer 102 of FIG. 1, according to one embodiment. As shown, the operation 200 begins at step 210, where a user 204 of a management console 202 requests an application 158 and/or the operating system 160 to perform a predefined command. The management console 202 executes on the computer 170$_1$, and the request is sent to the management controller 150 via the out-of-band network 130$_1$. Further, the request includes an invocation of one or more functions specified in the first API 152. At step 220, the management controller 150 sends the request to the execution engine 154 via the private network 113.

At step 230, the execution engine 154 retrieves and executes business logic 156 associated with the invoked function. The business logic 156 is executed such that the application 158 and/or the operating system 160 execute the predefined command. At step 240, the application 158 and/or the operating system 160 may return a result. If so, the execution engine 154 may return the result to the management controller 150 via the private network 113 (step 250). Alternatively, the execution engine 154 may transform the result before returning the transformed result to the management controller 150 via the private network 113. The result may be transformed to include additional information in the result, to remove a subset of information contained in the result, to reformat or repackage a result, etc. At step 260, the management controller 150 may return the result via the out-of-band network 130$_1$ to the management console 202. Alternatively, the management controller 150 may also transform the result before returning the transformed result to the management console 202. After the step 260, the operation 200 terminates.

Figure 3:
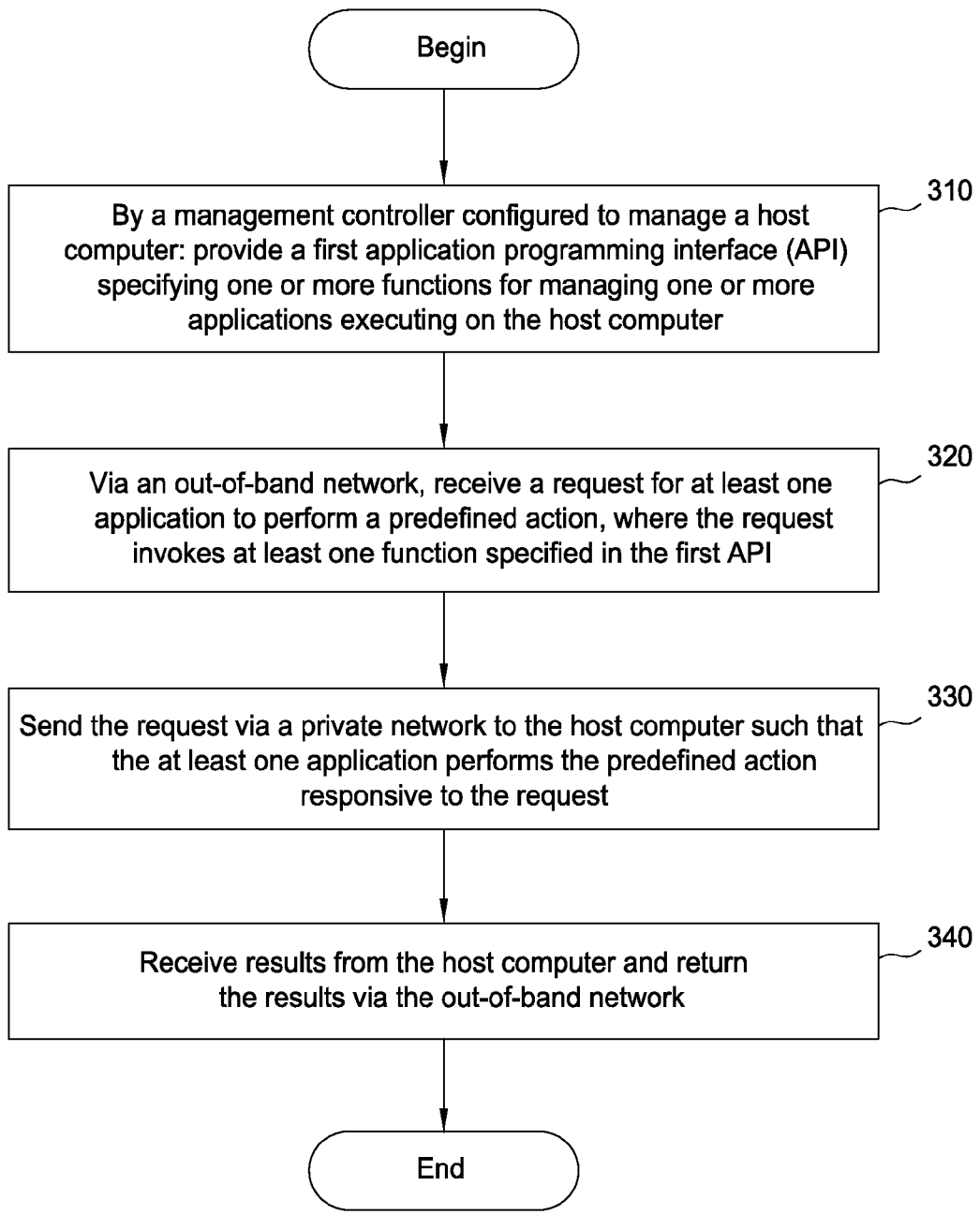
FIG. 3 is a flowchart depicting a method for managing the host computer, from a perspective of the management controller, according to one embodiment.

FIG. 3 is a flowchart depicting a method 300 for managing the computer 102 of FIG. 1, from a perspective of the management controller 150, according to one embodiment. The method 300 begins at step 310, where the management controller 150 provides the first API 162 specifying one or more functions for managing one or more applications executing on the computer 102. At step 320, the management controller 150 receives, from a management console 202 via the out-of-band network 130$_1$, a request for at least one application to perform a predefined action, where the request invokes at least one function specified in the first API 162.

At step 330, the management controller 150 sends the request via the private network 113 to the processor 104 of the computer 102. In response, the application performs the predefined action. At step 340, the management controller 150 receives, from the processor 104 of the computer 102, results of performing the predefined action. The management controller 150 may then return the results to the management console 202. After the step 340, the method 300 terminates.

Figure 4:
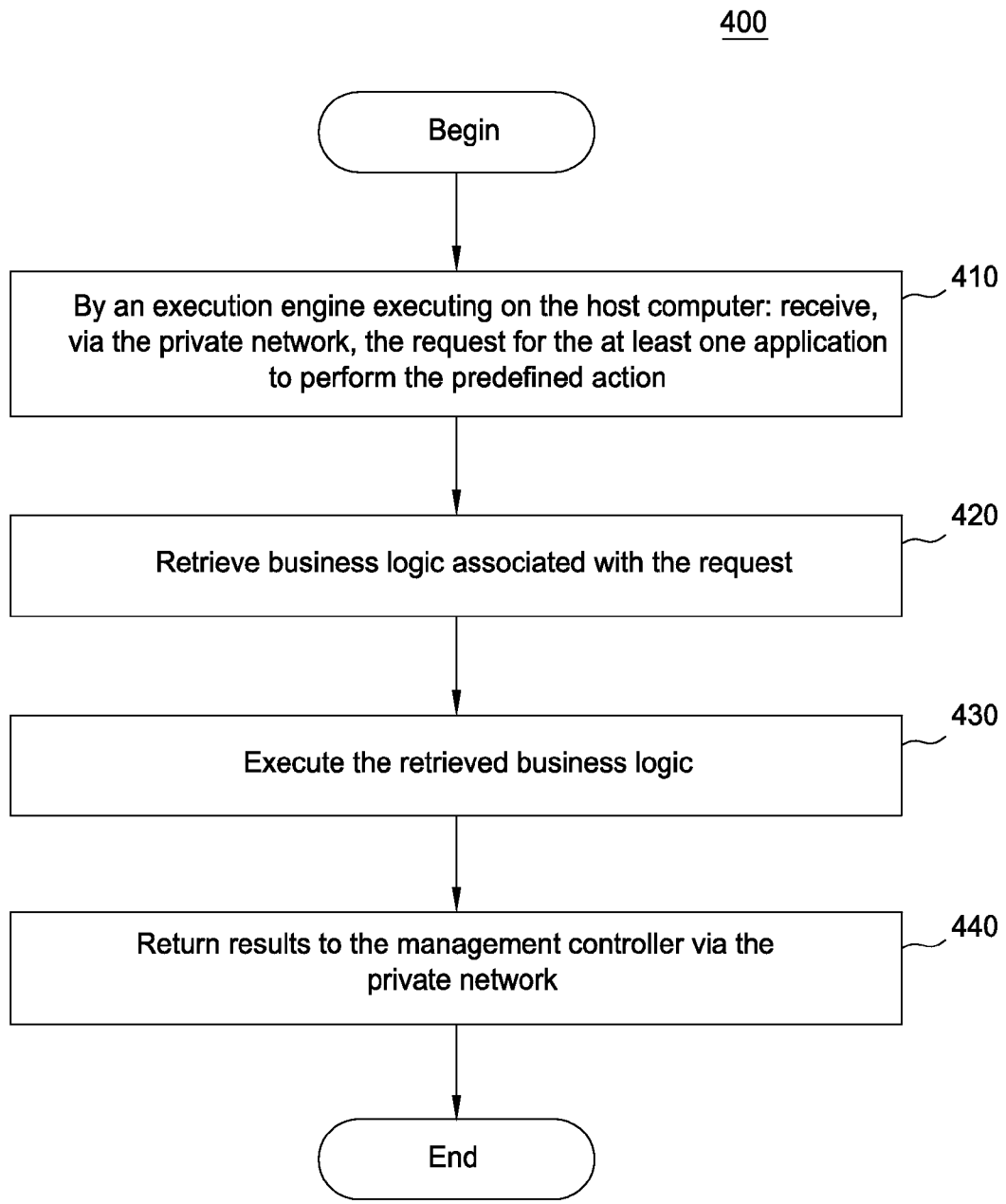
FIG. 4 is a flowchart depicting a method for managing the host computer, from a perspective of an execution engine, according to one embodiment.

FIG. 4 is a flowchart depicting a method 400 for managing the computer 102 of FIG. 1, from a perspective of the execution engine 154, according to one embodiment. The method 400 begins at step 410, where the execution engine 154 receives, from the management controller 150 via the private network 113, a request for at least one application to perform a predefined action. The predefined action may correspond to the predefined action requested in FIG. 3. At step 420, the execution engine 154 retrieves business logic associated with the request. The business logic may be retrieved based on an indication of the function invoked by the request. At step 430, the execution engine 154 executes the retrieved business logic. At step 440, the execution engine 154 returns, to the management controller 150, results obtained from executing the retrieved business logic. After the step 440, the method 400 terminates.

Figure 5:
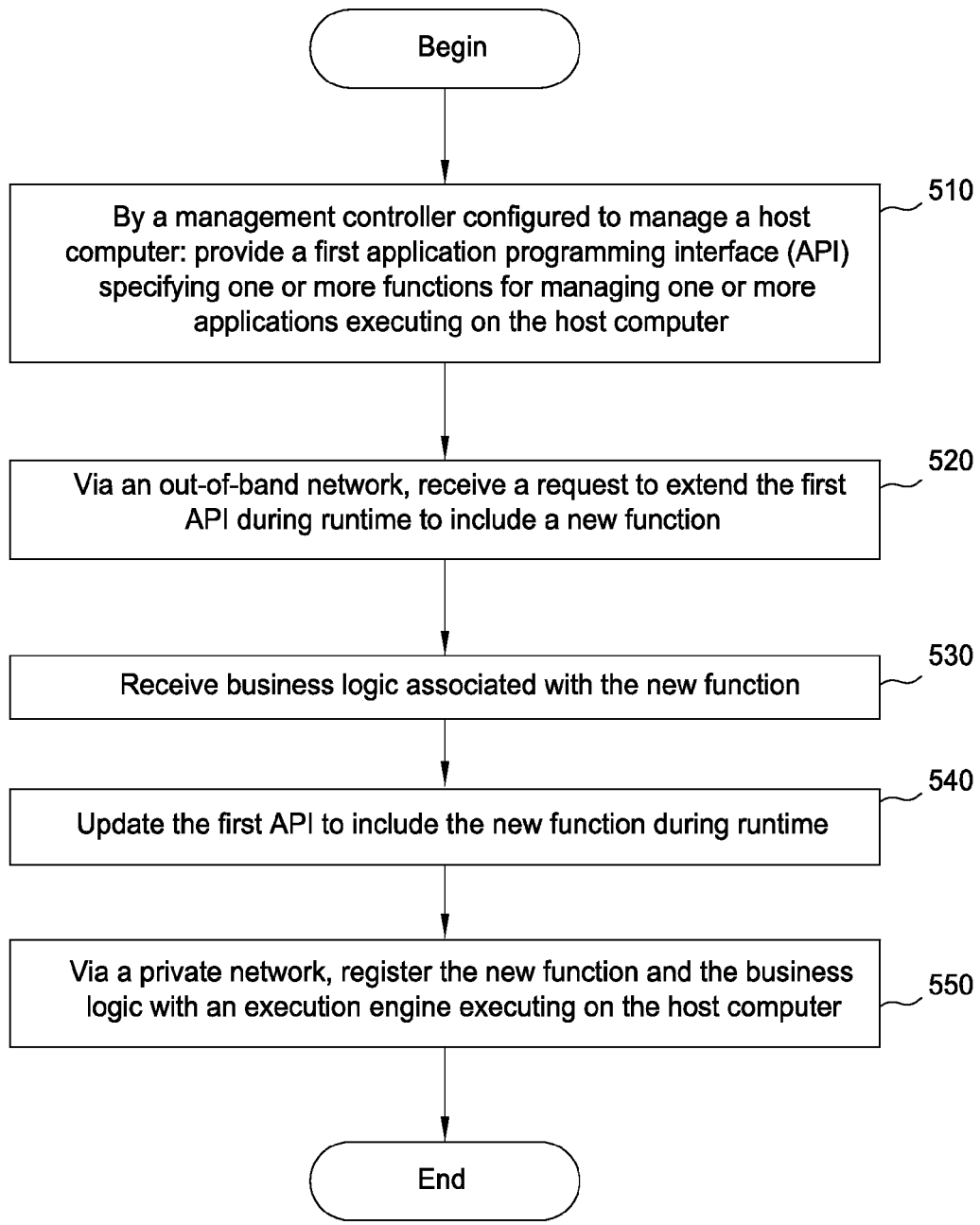
FIG. 5 is a flowchart depicting a method for extending a first API provided by the management controller, according to one embodiment.

FIG. 5 is a flowchart depicting a method 500 for extending the first API of FIG. 1, according to one embodiment. Extending the first API allows the management controller 150 to manage operation of a broader variety of applications executing on the computer 102. At least in some cases, the management controller 150 may more conveniently manage applications from different application vendors and/or applications of different versions. As shown, the method 500 begins at step 510, where the management controller 150 provides the first API, the first API specifying one or more functions for managing one or more applications executing on the computer 102. At step 520, the management controller 150 receives, from the management console 202, a request to extend the first API to include a new function during runtime. The request may specify information for creating the new function, such as a name for the new function and/or business logic associated with the new function. Alternatively embodiment, the management console 202 sends the business logic to the management controller 150 via a separate message, which the management controller 150 receives at step 530.

At step 540, the management controller 150 updates the first API to include the new function. To this end, the first API may be updated without requiring the management controller 150 to be restarted. At step 550, the management controller 150 may register the new function and the business logic with the execution engine 154 executing on the computer 102, e.g., by sending one or more messages to the execution engine 154 via the private network 113. To this end, the execution engine 154 may associate the new function and the business logic.

Advantageously, embodiments described above provide approaches for managing a computer via an out-of-band network. In one embodiment, a management controller provides an application programming interface (API) specifying one or more functions for managing one or more applications executing on a host computer. The API may also be extensible during runtime to include additional functions for managing the one or more applications. Using the API, the one or more applications may be managed more conveniently and/or efficiently at least in some cases, without requiring drivers to be written for the operating system executing on the host computer.

In view of the foregoing, the scope of the present disclosure is determined by the claims that follow.

We claim:
1. A system comprising:
one or more computer processors;
a memory containing one or more applications; and
a management controller communicatively connected to:
(i) an out-of-band network for accessing the management controller and (ii) a private network of a first communications protocol and for communicating with an execution engine running on the system, the private network provided via one or more network interface controllers over a predefined link of a second communications protocol between the management controller and the one or more computer processors; wherein the management controller is configured to perform an operation for managing the system, the operation comprising:
providing a first application programming interface (API) specifying one or more functions for managing at least a first one of the one or more applications, without requiring any driver associated with the first API to be provided for any operating system executing on the system;
via the out-of-band network, receiving a first request for the first application to perform a predefined action that includes invoking one or more functions of a second API provided by an operating system executing on the system, wherein the first request invokes a function specified in the first API; and
via the private network, sending the first request by operation of at least one computer processor to the execution engine to instruct the first application to perform the predefined action responsive to the first request;

wherein the management controller is further configured to extend the first API during runtime to include a desired function not already included in the first API, by:

receiving, via the out-of-band network: (i) a second request to extend the first API during runtime to include the desired function and (ii) business logic to associate with the desired function; and registering the desired function and the business logic with the execution engine by sending one or more messages to the execution engine via the private network, wherein the execution engine is configured to associate the desired function with the business logic.

2. The system of claim 1, wherein the first request is received by the management controller when an in-band network of the system is unavailable, wherein the operation further comprises:

authenticating the first request for the first application to perform the predefined action.

3. The system of claim 1, wherein the management controller is configured to independently send, to the execution engine, each individual first request selected from:
  (i) a request to configure a network address of the system on an in-band network;
  (ii) a request to configure a secure sockets layer (SSL) certificate for the in-band network;
  (iii) a request to send one or more patches to be executed on the system;
  (iv) a request to power off the system; and
  (v) a request to route network traffic through the private network and the management controller rather than through the in-band network.

4. A management controller configured to perform an operation comprising:

providing a first application programming interface (API) specifying one or more functions for managing one or more applications executing on a host computer that includes the management controller, without requiring any driver associated with the first API to be provided for any operating system executing on the host computer;

via an out-of-band network for accessing the management controller, receiving a first request for a first one of the applications to perform a predefined action that includes invoking one or more functions of a second API provided by an operating system executing on the host computer, wherein the first request invokes a function specified in the first API; and via a private network of a first communications protocol and provided via one or more network interface controllers over a predefined link of a second communications protocol between the management controller and the host computer and communicatively connecting the management controller to an execution engine running on the host computer, sending the first request by operation of one or more computer processors to the execution engine to instruct the first application to perform the predefined action responsive to the first request;

wherein the management controller is further configured to extend the first API during runtime to include a desired function not already included in the first API, by:

receiving, via the out-of-band network: (i) a second request to extend the first API during runtime to include the desired function and (ii) business logic to associate with the desired function; and registering the desired function and the business logic with the execution engine by sending one or more messages to the execution engine via the private network, wherein the execution engine is configured to associate the desired function with the business logic.

5. The management controller of claim 4, wherein first the request is received by the management controller when an in-band network of the host computer is unavailable, wherein the operation further comprises:

authenticating the first request for the first application to perform the predefined action.

6. The management controller of claim 4, wherein the management controller is configured to independently send, to the execution engine, each individual first request selected from:
  (i) a request to configure a network address of the host computer on an in-band network;
  (ii) a request to configure a secure sockets layer (SSL) certificate for the in-band network;
  (iii) a request to send one or more patches to be executed on the host computer;
  (iv) a request to power off the host computer; and
  (v) a request to route network traffic through the private network and the management controller rather than through the in-band network.

7. A computer-implemented method comprising:

providing a first application programming interface (API) specifying one or more functions for managing one or more applications executing on a host computer, without requiring any driver associated with the first API to be provided for any operating system executing on the host computer;

via an out-of-band network for accessing a management controller configured to manage the host computer, receiving a first request for a first one of the applications to perform a predefined action that includes invoking one or more functions of a second API provided by an operating system executing on the host computer, wherein the first request invokes a function specified in the first API; and via a private network of a first communications protocol and provided via one or more network interface controllers over a predefined link of a second communications protocol between the management controller and the host computer and communicatively connecting the management controller to an execution engine running on the host computer, sending the first request by operation of one or more computer processors to the execution engine to instruct the first application to perform the predefined action responsive to the first request;

wherein the management controller is further configured to extend the first API during runtime to include a desired function not already included in the first API, by:

receiving, via the out-of-band network: (i) a second request to extend the first API during runtime to include the desired function and (ii) business logic to associate with the desired function; and registering the desired function and the business logic with the execution engine by sending one or more messages to the execution engine via the private network, wherein the execution engine is configured to associate the desired function with the business logic.

8. The computer-implemented method of claim 7, wherein the first request is received by the management controller when an in-band network of the host computer is unavailable, wherein the method further comprises:

authenticating the first request for the first application to perform the predefined action.

9. The computer-implemented method of claim 7, wherein the management controller is configured to independently send, to the execution engine, each individual first request selected from:
   (i) a request to configure a network address of the host computer on an in-band network;
   (ii) a request to configure a secure sockets layer (SSL) certificate for the in-band network;
   (iii) a request to send one or more patches to be executed on the host computer;
   (iv) a request to power off the host computer; and
   (v) a request to route network traffic through the private network and the management controller rather than through the in-band network.

10. The computer-implemented method of claim 7, wherein the first and second requests are received from a management console, wherein the predefined action includes associated business logic, wherein the first application performs the predefined action to generate a result, wherein the result is returned from the application to the execution engine, wherein the execution engine returns the result to the management controller via the private network, wherein the management controller returns the result to the management console via the out-of-band network.

* * * * *